(12) United States Patent
Garvey et al.

(10) Patent No.: US 11,176,089 B2
(45) Date of Patent: Nov. 16, 2021

(54) SYSTEMS AND METHODS FOR IMPLEMENTING DYNAMIC FILE SYSTEMS

(71) Applicant: Apple Inc., Cupertino, CA (US)

(72) Inventors: John Garvey, Victoria (CA); Michael S. Mackovitch, Sunnyvale, CA (US); Peter J. Rutenbar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 852 days.

(21) Appl. No.: 15/377,996

(22) Filed: Dec. 13, 2016

(65) Prior Publication Data

US 2017/0357657 A1     Dec. 14, 2017

Related U.S. Application Data

(60) Provisional application No. 62/348,814, filed on Jun. 10, 2016.

(51) Int. Cl.
*G06F 16/11* (2019.01)
*G06F 16/17* (2019.01)
*G06F 3/06* (2006.01)

(52) U.S. Cl.
CPC .......... *G06F 16/122* (2019.01); *G06F 3/0604* (2013.01); *G06F 3/0644* (2013.01); *G06F 3/0673* (2013.01); *G06F 16/1727* (2019.01)

(58) Field of Classification Search
CPC .................................................. G06F 16/122
See application file for complete search history.

(56) References Cited

U.S. PATENT DOCUMENTS

| 7,783,850 | B2 | 8/2010 | Vu et al. |
| 7,899,795 | B1 | 3/2011 | Kahn et al. |
| 8,156,080 | B2 | 4/2012 | Beck |
| 8,677,090 | B2 | 3/2014 | Araki |
| 8,725,971 | B2 | 5/2014 | Nakamura et al. |
| 2004/0123062 | A1* | 6/2004 | Dalal ................ G06F 11/1096 711/170 |
| 2008/0168108 | A1* | 7/2008 | Molaro .............. G06F 11/1435 |
| 2013/0275375 | A1* | 10/2013 | Nickolov ............ G06F 9/5072 707/636 |
| 2014/0006731 | A1 | 1/2014 | Uluski et al. |

(Continued)

FOREIGN PATENT DOCUMENTS

WO      2008042437 A2     4/2008

OTHER PUBLICATIONS

International Patent Application No. PCT/US2017/036508—International Search Report and Written Opinion dated Sep. 27, 2017.

*Primary Examiner* — Van H Oberly
(74) *Attorney, Agent, or Firm* — Dickinson Wright RLLP

(57) ABSTRACT

Representative embodiments set forth herein disclose techniques for implementing dynamic file system volumes that can share storage space with other file system (FS) volumes within the same partition/storage device. According to some embodiments, techniques are disclosed for establishing an FS volume within a container. According to other embodiments, techniques are disclosed for handling input/output (I/O) requests across different FS volumes. According to yet other embodiments, techniques are disclosed for efficiently establishing, within a storage device, an FS volume from an image of the FS volume.

20 Claims, 10 Drawing Sheets

(56) References Cited

U.S. PATENT DOCUMENTS

| | | | |
|---|---|---|---|
| 2014/0019495 A1* | 1/2014 | Borthakur | G06F 11/1435 707/827 |
| 2015/0193338 A1 | 7/2015 | Sundaram et al. | |
| 2015/0227543 A1* | 8/2015 | Venkatesh | G06F 16/119 707/620 |
| 2015/0339077 A1 | 11/2015 | Horn et al. | |
| 2016/0048431 A1 | 2/2016 | Modukuri et al. | |
| 2017/0031774 A1* | 2/2017 | Bolen | G06F 3/0619 |

* cited by examiner

SYSTEMS AND METHODS FOR IMPLEMENTING DYNAMIC FILE SYSTEMS

CROSS-REFERENCE TO RELATED APPLICATION

The present application claims the benefit of U.S. Provisional Application No. 62/348,814, entitled "SYSTEMS AND METHODS FOR IMPLEMENTING DYNAMIC FILE SYSTEMS" filed Jun. 10, 2016, the content of which is incorporated herein by reference in its entirety for all purposes.

FIELD

The described embodiments relate generally to file systems within computing devices. More particularly, the described embodiments relate to implementing dynamic file system volumes that can share storage space with other file system volumes within the same partition/storage device

BACKGROUND

A modern computing device typically includes a main storage device (e.g., a hard disk drive, a solid state drive, etc.) that is separated into multiple partitions, where each partition includes a single file system that serves a particular purpose with respect to the operation of the computing device. For example, an operating system (OS) partition can include an OS file system for executing a main OS, a user partition can include a user file system for storing user files (e.g., documents, media data, etc.), a recovery partition can include a recovery file system for carrying out a recovery procedure (e.g., a restoration of the main OS), and the like. In this configuration, a basic input/output system (BIOS) of the computing device, when powered-on, reads and then executes the OS files in the OS partition to cause the OS to properly initialize and execute on the computing device.

In most cases, the different partitions are sized according to best-estimates for the amount of storage space that their respective file systems will require over time to ensure that the computing device operates properly. For example, the OS partition can be sized slightly above a minimum amount of storage space required to store the OS file system in order to maximize the amount of free storage space available to other partitions, e.g., the user partition. Oftentimes, however, storage space requirements for the OS file system will exceed the amount of available storage space that is allocated to OS partition, e.g., when a substantial OS update is available. Consequently, this can necessitate the execution of one or more partition resizing operations prior to processing the OS update, which can be a complex task that is resource-intensive and prone to error. For example, some file system limitations dictate that a partition can be "grown" (i.e., increased in size) from the end of the partition, but cannot be grown from the start of the partition. As a result, this limitation can make increasing the size of the OS partition problematic when the end of the OS partition abuts the start of another partition (e.g., the user partition). Another example file system limitation dictates that, due to the lack of safety of an overlapping block copy process, the size of the partition can only be increased by a size greater than 2*N, where N is the current size of the partition. Consequently, this can result in wasteful consumption of free storage space within the storage device when the additional amount of storage space required to store the updated recovery OS is only marginal.

Consequently, there exists a need for an improved technique for managing partitions and file systems in a manner that increases their flexibility to accommodate the ever-changing requirements of computing devices.

SUMMARY

Accordingly, representative embodiments set forth herein disclose various techniques for implementing dynamic file system volumes that can share storage space with other file system volumes within the same partition/storage device.

According to some embodiments, a method for establishing a file system (FS) volume within a container can include the steps of (1) receiving a request to establish the FS volume within the container, where the container is configured to include at least one other FS volume, (2) referencing an FS volume table of the container to identify whether the FS volume can be established within the container, and (3) when the FS volume can be established: (i) establishing the FS volume within the container, and (ii) updating the FS volume table to reflect that the FS volume is established within the container.

Other embodiments include a method for handling input/output (I/O) requests across different FS volumes. According to some embodiments, the method can include the steps of (1) receiving an I/O request for the first FS volume, (2) parsing information associated with the first FS volume and at least one other FS volume to determine whether the I/O request can be satisfied, and (3) when the I/O request can be satisfied: (i) executing the I/O request, (ii) updating the information to reflect that the I/O request is executed, and (iii) issuing a response to the I/O request.

Yet other embodiments include a method for efficiently establishing, within a storage device, an FS volume from an image of the FS volume. According to some embodiments, the method can include the steps of (1) receiving an indication that the image of the FS volume is available, (2) creating a new FS volume within a container, wherein the new FS volume includes first metadata, (3) storing the image of the FS volume within the new FS volume, wherein the FS volume includes second metadata, and (4) replacing the first metadata of the new FS volume with the second metadata of the FS volume.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
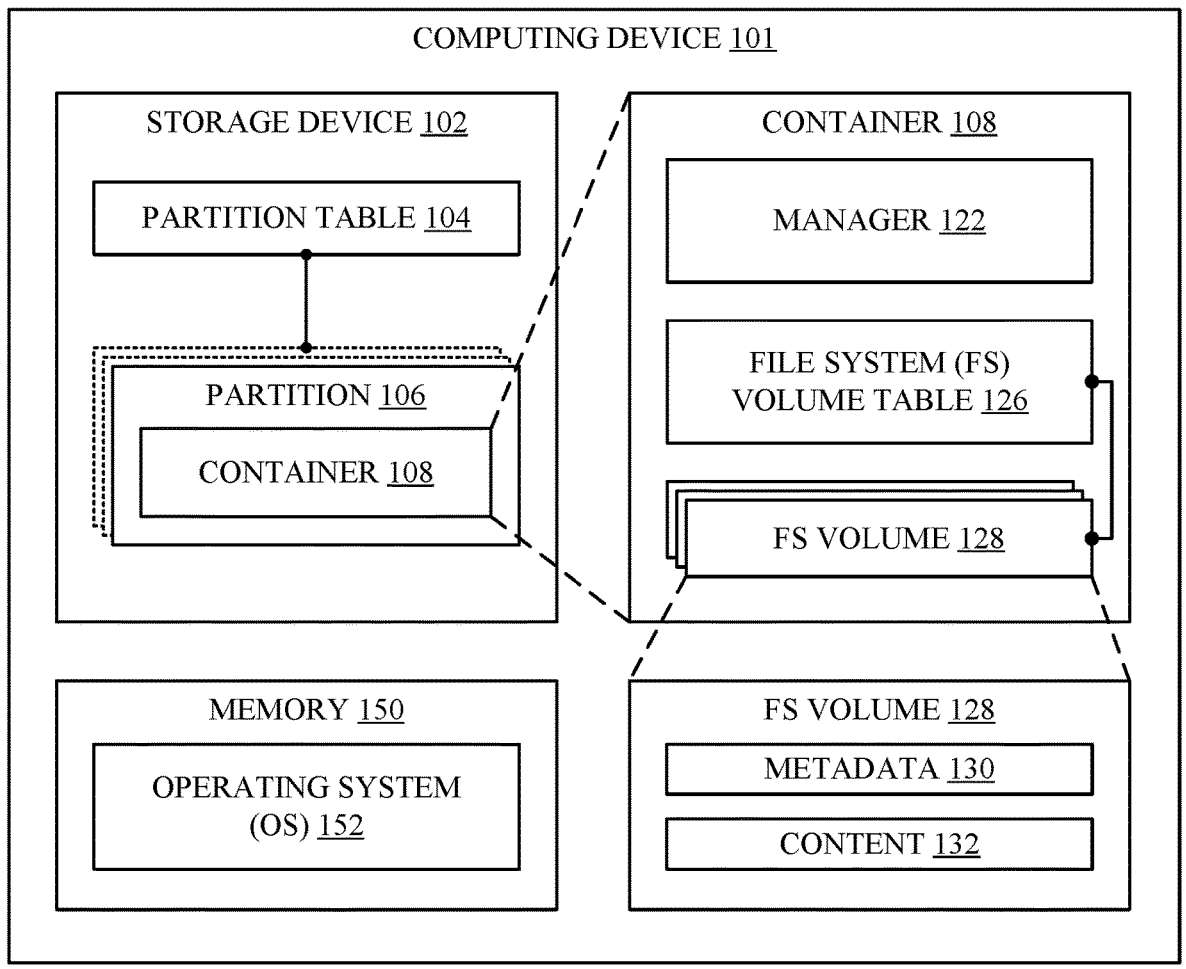
FIG. 1 illustrates a system diagram of a computing device that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Representative embodiments described herein set forth a technique for implementing dynamic file system (FS) volumes that can share storage space with other file system volumes within the same partition/storage device. According to some embodiments, the storage device (managed by a computing device) can be configured to include a partition table that is used to define the manner in which one or more partitions are established within the storage device. Notably, although the techniques described herein typically incorporate one or more partitions, the scope of this disclosure is not so limited. Instead, the storage device can be configured to include a single/global partition that spans all of the physical storage blocks (i.e., contiguous sequences of bytes/bits) in the storage device.

According to some embodiments, each partition can be configured to include a container that represents a logical entity that encompasses FS volumes. According to some embodiments, each container can be configured to include a manager that represents combination of logic (e.g., an Application Programming Interface (API)) as well as information for managing various aspects of the operation of the container in which the manager is included, which is described in greater detail herein. For example, the manager can be utilized to create, modify, and delete FS volumes within the container. Moreover, the manager can be utilized to service input/output (I/O) requests issued by different FS volumes for storage space management, e.g., storage space allocation requests, storage space deletion requests, and the like. Moreover, the manager can be configured to maintain crash protection information as a unified checkpoint log in accordance with the aforementioned I/O requests that the manager is configured to handle. In this manner, when coherency issues arise between one or more FS volumes, the crash protection information can be utilized to perform different recovery operations that can help restore overall coherency to the FS volumes.

Accordingly, the partitions/containers can be utilized to implement various FS volumes within the storage device of the computing device. According to some embodiments, each FS volume can be configured to include metadata and content, where the metadata stores information about the FS volume, e.g., a type of the FS volume, encryption schemes (if any) that are implemented within the FS volume, information about the content, and the like. According to some embodiments, the content stores information about the actual data of the FS volume, e.g., files, directories, and the like. For example, the content can include various data structures (e.g., tables, trees, lists, etc.) that define a manner in which the various files, directories, etc. are related to one another and hierarchically organized. Moreover, the various data structures can include information pertaining to the storage locations of the various files, directories, etc., within the storage device, e.g., physical storage block addresses, offsets, and the like.

It is additionally noted that although the techniques described herein involve implementing a highly-flexible environment in which FS volumes can freely grow and shrink as needed, the techniques also can accommodate size-specific requests with respect to the establishment of FS volumes within a storage device. For example, when establishing new FS volume within a given container, a specification can be made that the new FS volume will require at least eight gigabytes (8 GB) of storage space, e.g., for an OS that will subsequently be loaded into the new FS volume. In turn, this requirement may or may not be satisfied depending on the amount of storage space that is available within the partition to which the container is assigned. For example, if the container is assigned to a partition having a fixed size of ten gigabytes (10 GB), and another FS volume 128 exists within the container 108 that is utilizing five gigabytes (5 GB) of the available (10 GB), then the minimum size requirement of eight gigabytes (8 GB) cannot be satisfied. In this manner, appropriate warnings/adjustments can be issued in conjunction with establishing partitions/containers/FS volumes to ensure that the expected requirements are met. It is additionally noted that virtually any requirement can be implemented in conjunction with the techniques described herein, e.g., a required storage size range for an FS volume, a maximum expected size for an FS volume, and so on.

Additionally, the embodiments set forth a technique for efficiently establishing an FS volume within the storage device from an image of an established (i.e., data-populated) FS volume. According to some embodiments, this technique can be utilized to avoid the necessity of extracting and writing the content of the FS volume to the storage device after the image of the FS volume is initially written to the storage device (e.g., as a single file), which otherwise would be required and consume a considerable amount of resources/time. In one example, this technique can be implemented to increase the efficiency by which intensive updates to file systems are installed onto the computing device. For example, this technique can be used to replace an existing FS volume for a primary OS of the computing device with an image of a new FS volume for an updated OS.

FIG. 1 illustrates a system 100 of a computing device 101 that can be configured to perform the various techniques described herein, according to some embodiments. The computing device 101 can represent a smartphone, tablet, laptop, desktop, display, watch, media player, or any other suitable computing device. As shown in FIG. 1, the computing device 101 can include a storage device 102, which can represent a hard disk drive, a solid state drive, a combination of drives, and the like. As also shown in FIG. 1, the computing device 101 can include a memory 150 into which an operating system (OS) 152/various user applications (not illustrated in FIG. 1) can be loaded and executed by a processor (also not illustrated in FIG. 1) to perform the various techniques described herein.

According to some embodiments, the storage device 102 can be configured to include a partition table 104 that is used to define the manner in which one or more partitions 106 are established within the storage device 102. Notably, although the drawings and the accompanying descriptions indicate multiple partitions, the embodiments described herein are not so limited. Instead, the storage device 102 can be configured to include a single/global partition that spans all of the physical storage blocks (i.e., contiguous sequences of bytes/bits) in the storage device 102.

As shown in FIG. 1, each partition 106 can be configured to include a container 108, where the container 108 represents a logical entity that encompasses one or more file system (FS) volumes. More specifically, and as illustrated in FIG. 1, each container 108 can be configured to include a manager 122, an FS volume table 126, and FS volumes 128. According to some embodiments, the manager 122 represents a combination of logic (e.g., an Application Programming Interface (API)) as well as information for managing various aspects of the operation of the container 108 in which the manager 122 is included. For example, the manager 122 can be utilized (e.g., by the operating system 152—or other entity executing at the computing device 101/connected to the computing device 101) to create, modify, and delete FS volumes 128 within the container 108. Moreover, the manager 122 can be utilized to service input/output (I/O) requests issued by different FS volumes 128 for storage space management, e.g., storage space allocation requests, storage space deletion requests, and the like. Moreover, the manager 122 can be configured to maintain crash protection information as a unified checkpoint log in accordance with the aforementioned I/O requests that the manager 122 is configured to handle. Additionally, the manager 122 can be configured to implement the FS volume table 126 as a way to manage the FS volumes 128 within the container 108. For example, the manager 122 can reference the FS volume table 126 when servicing requests to add, modify, or delete FS volumes 128 within the container 108 to identify how/whether the requests should be properly handled.

Accordingly, the partitions 106/containers 108 can be utilized to implement various FS volumes 128 within the storage device 102 of the computing device 101. According to some embodiments, and as shown in FIG. 1, each FS volume 128 can be configured to include metadata 130 and content 132. According to some embodiments, the metadata 130 can store information about the FS volume 128, e.g., a type of the FS volume 128, encryption schemes (if any) that are implemented within the FS volume 128, information about the content 132, and the like. According to some embodiments, the content 132 stores information about the actual data of the FS volume 128, e.g., files, directories, and the like. For example, the content 132 can include various data structures (e.g., tables, trees, lists, etc.) that define a manner in which the various files, directories, etc. are related to one another and hierarchically organized. Moreover, the various data structures can include information pertaining to the storage locations of the various files, directories, etc., within the storage device 102, e.g., physical storage block addresses, offsets, and the like.

Figure 2:
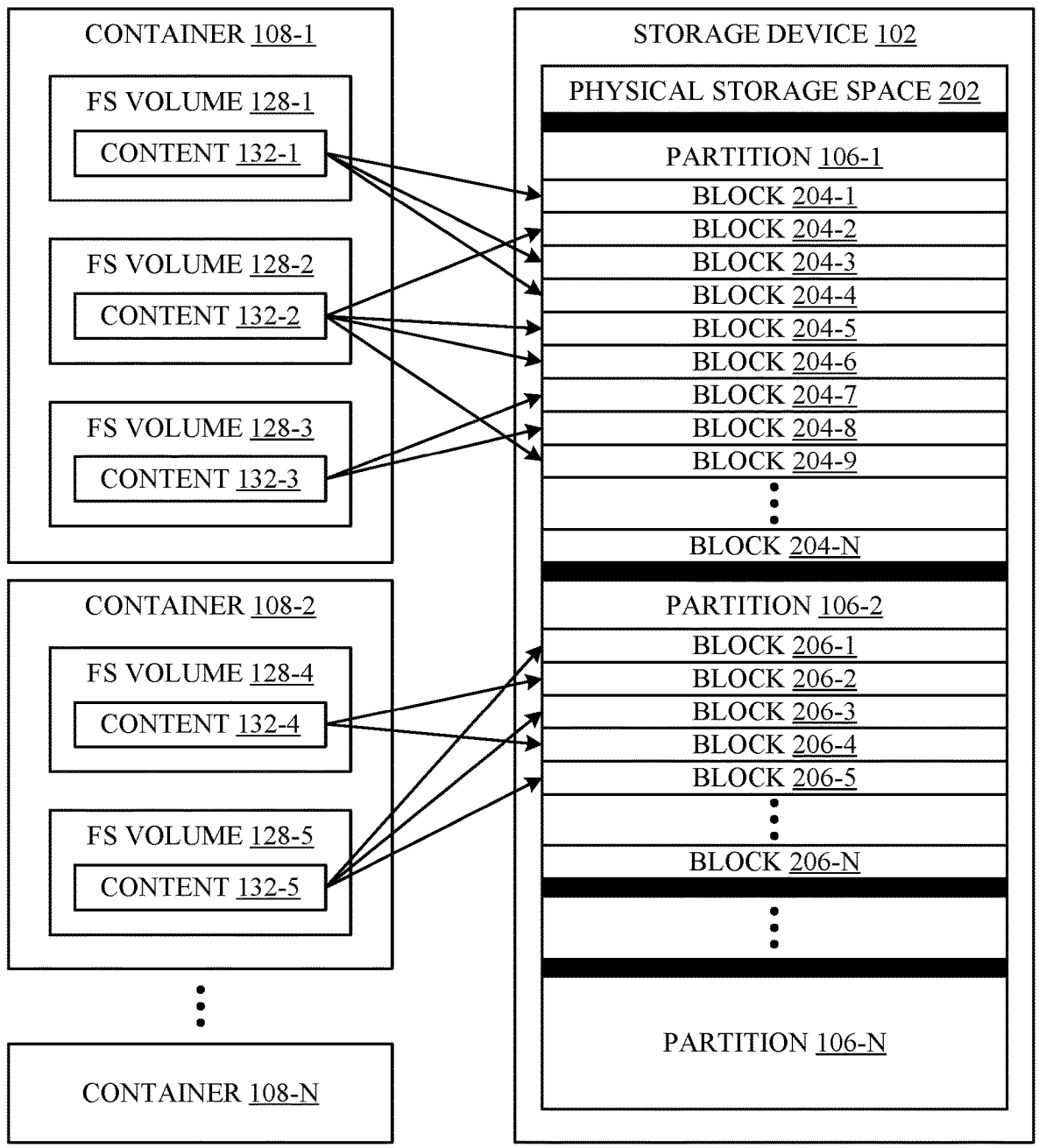
FIG. 2 illustrates a conceptual diagram of an example scenario of different containers/FS volumes established within a storage device of the computing device of FIG. 1, according to some embodiments.

FIG. 2 illustrates a conceptual diagram 200 of an example scenario of different containers 108/FS volumes 128 established within the storage device 102 of FIG. 1, according to some embodiments. It is noted that the example scenario illustrated in FIG. 2 is merely exemplary and that any number of partitions 106, containers 108, and FS volumes 128 can be established within the storage device 102 to meet different configuration requirements of the computing device 101. For example, the storage device 102 can include only a single partition 106 and a single container 108, where the single container 108 can be configured to include one or more FS volume 128. In this manner, the one or more FS volumes 128 can be configured to flexibly share the available storage space within the storage device 102 without requiring any partitions to be established, resized, or eliminated. Moreover, the one or more FS volumes 128 can be configured to implement different encryption schemes as the metadata 130/content 132 of each FS volume 128 is logically separated from the other FS volumes 128. Accordingly, the techniques described herein can be utilized to establish any number of partitions 106, containers 108, and FS volumes 128 to meet different operational requirements.

As shown in the example scenario illustrated in FIG. 2, the storage device 102 includes multiple partitions 106 within a physical storage space 202. In particular, the multiple partitions 106 include a first partition 106-1 and a second partition 106-2. As also shown in FIG. 2, the first partition 106-1 includes multiple blocks 204-1 through 204-N, where each block 204 represents a physical storage block (i.e., a contiguous sequence of bytes/bits) within the storage device 102. As further shown in FIG. 2, a first container 108-1 is assigned to the first partition 106-1 such that the different FS volumes 128 belonging to the first container 108-1 share the pool of blocks 204 within the first partition 106-1. For example, the first container 108-1 includes a first FS volume 128-1, where the content 132-1 of the first FS volume 128-1 is stored across various blocks 204 (e.g., the block 204-1, the block 204-3, and the block 204-4) within the first partition 106-1. Similarly, the first container 108-1 includes a second FS volume 128-2, where the content 132-2 of the second FS volume 128-2 also is stored across various blocks 204 (e.g., the block 204-2, the block 204-5, the block 204-6, and the block 204-9) within the first partition 106-1. Moreover, the first container 108-1 includes a third FS volume 128-3, where the content 132-3 of the third FS volume 128-3 also is stored across various blocks 204 (e.g., the block 204-7 and the block 204-8). Importantly, it is noted that the content 132-1, 132-2, and 132-3 is stored across different blocks 204 in an interleaved/non-contiguous fashion, such that the different FS volumes 128-1, 128-2, and 128-3 can share storage space in a flexible manner that does not require the first partition 106-1 to be resized.

Additionally, and continuing with the example scenario illustrated in FIG. 2, the second partition 106-2 includes multiple blocks 206-1 through 206-N. Similar to the container 108-1, a container 108-2 can be assigned to the second partition 106-2 such that the different FS volumes 128 belonging to the second container 108-1 share the pool of blocks 206 within the second partition 106-2. For example, the second container 108-2 includes a fourth FS volume 128-4, where the content 132-4 of the fourth FS volume 128-4 is stored across various blocks 206 (e.g., the block 206-2 and the block 206-4) within the second partition 106-2. Similarly, the second container 108-2 includes a fifth FS volume 128-5, where the content 132-5 of the fifth FS volume 128-5 also is stored across various blocks 206 (e.g., the block 206-1, the block 206-3, and the block 206-5) within the second partition 106-2.

As further shown in FIG. 2, additional containers 108 can be assigned to additional partitions 106 to establish additional FS volumes 128. Accordingly, FIG. 2 sets forth an example scenario in which different containers 108/FS volumes 128 can be implemented across one or more partitions 106. Again, it is noted that the example scenario illustrated in FIG. 2 is merely exemplary and that any number of partitions 106, containers 108, and FS volumes 128 can be established within the storage device 102 to meet different configuration requirements of the computing device 101.

Figure 3:
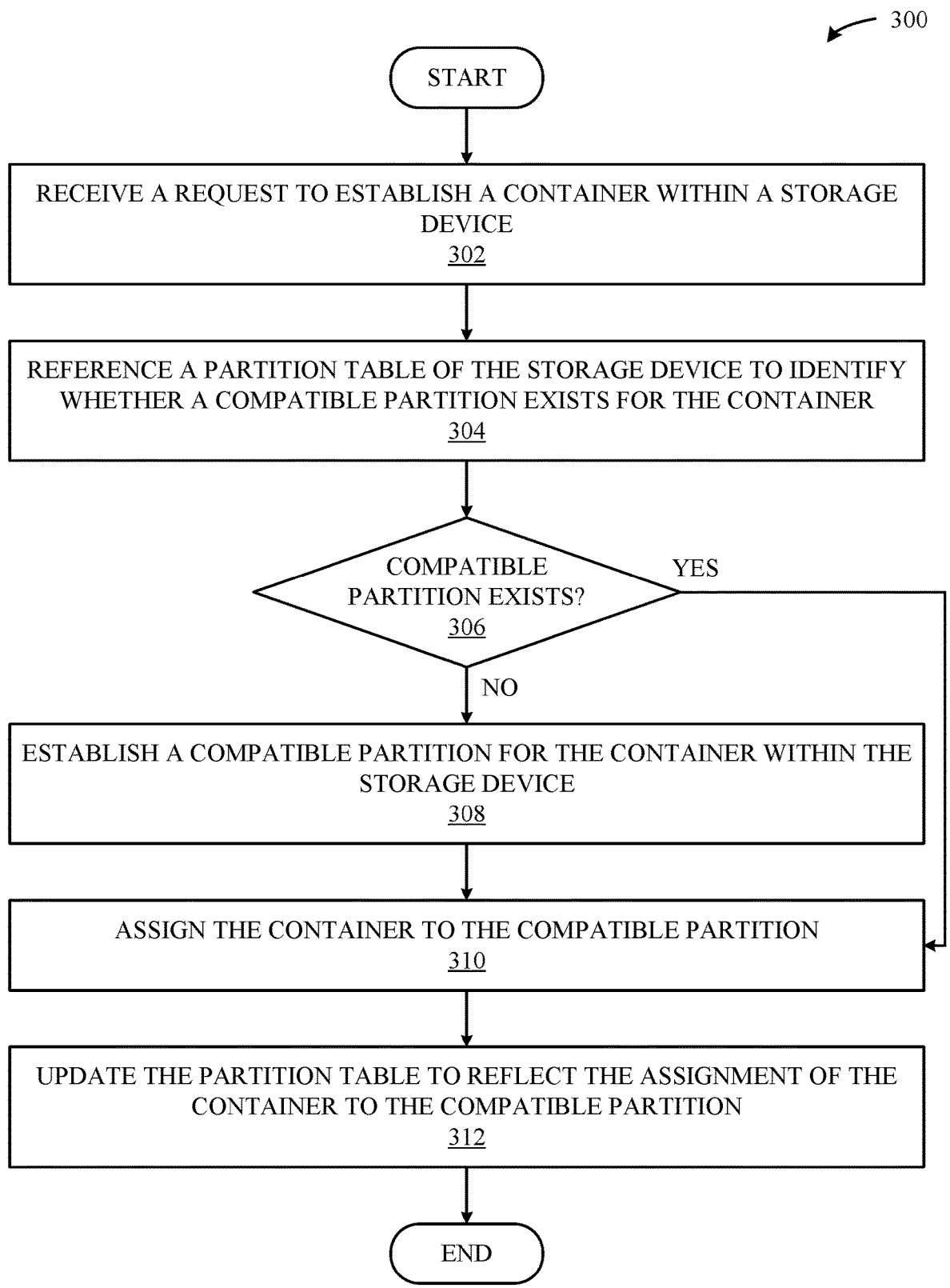
FIG. 3 illustrates a method for establishing a container within the storage device of the computing device of FIG. 1, according to some embodiments.
Figure 4:
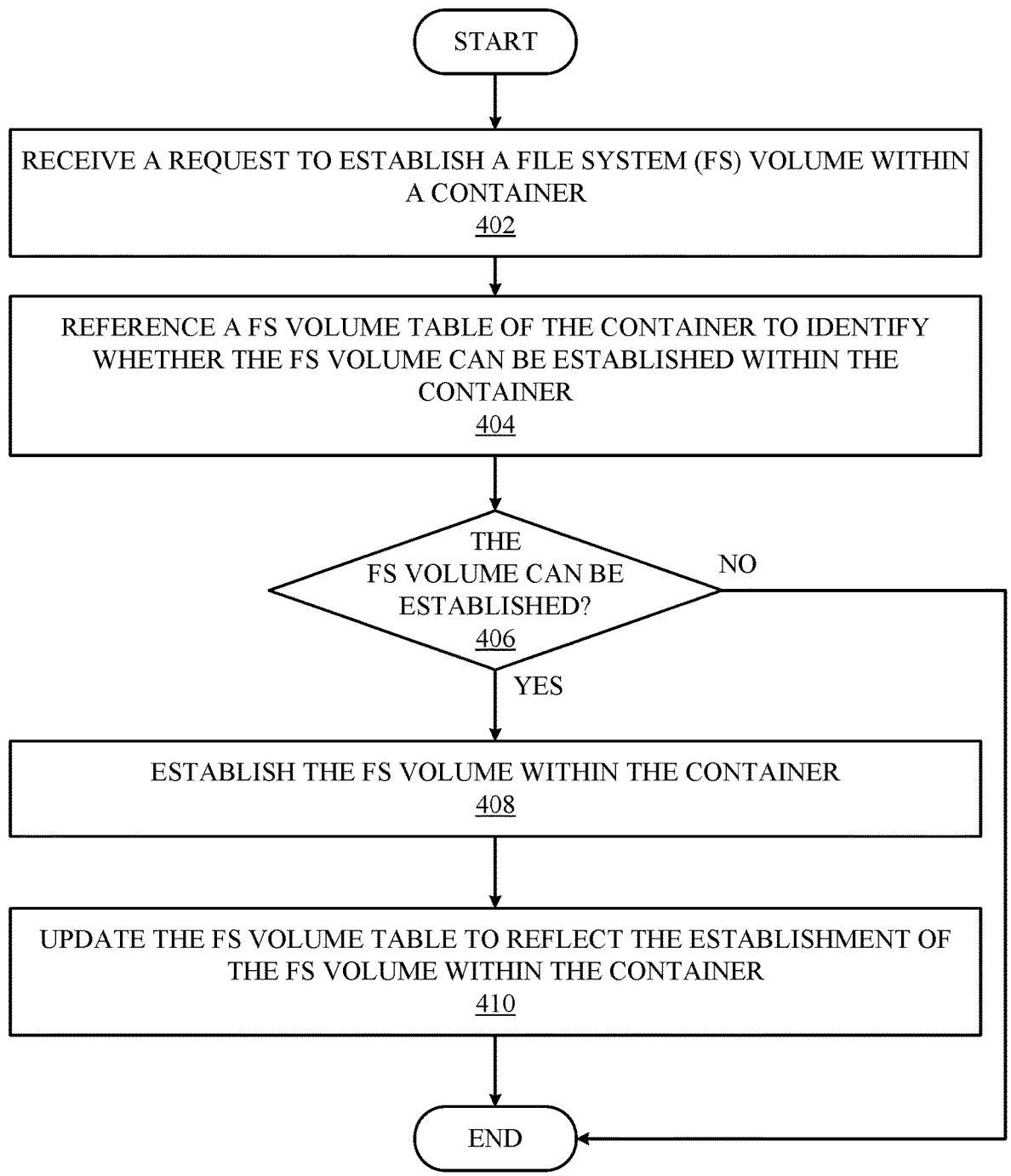
FIG. 4 illustrates a method for establishing a new FS volume within a container, according to some embodiments.
Figure 5:
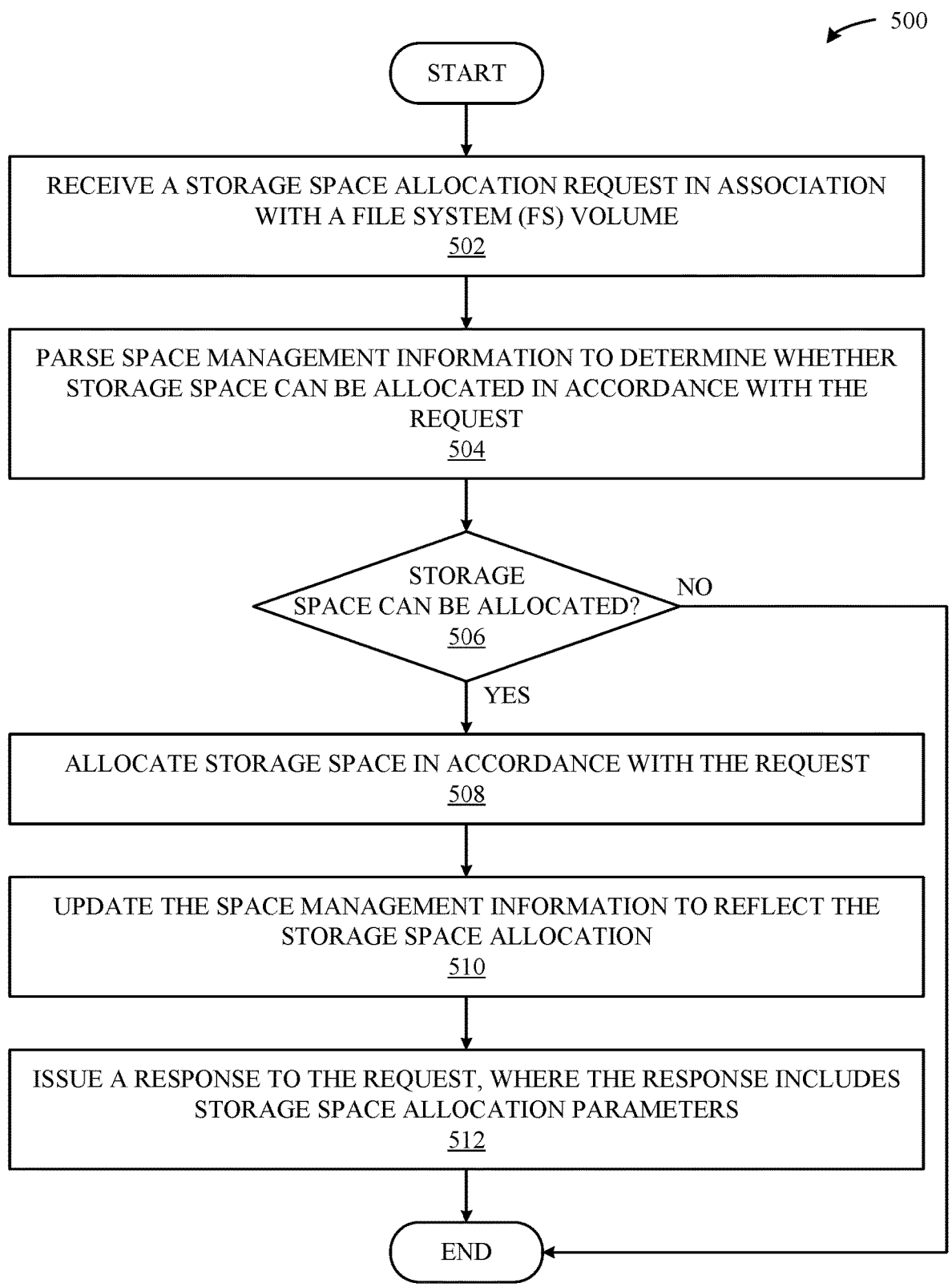
FIG. 5 illustrates a method for handling storage space allocation requests issued in association with an FS volume of a container, according to some embodiments.

In view of the foregoing, FIG. 1 sets forth the computing device 101 that can be configured to perform the various techniques described herein, according to some embodiments. Moreover, FIG. 2 illustrates the conceptual diagram 200 of an example scenario of different containers 108/FS volumes 128 established within the storage device 102 (of the computing device 101) of FIG. 1, according to some embodiments. Accordingly, FIGS. 3-4 provide a detailed breakdown of the manner in which containers 108 and FS volumes 128, respectively, can be managed within the storage device 102 of the computing device 101, according to some embodiments. Moreover, FIG. 5 provides a detailed breakdown of the manner in which requests—e.g., storage space allocation requests, storage space deletion requests, and the like—issued by different FS volumes 128 for storage space management can be handled, according to some embodiments.

FIG. 3 illustrates a method 300 for establishing a container 108 within the storage device 102, according to some embodiments. In the following description, the method 300 is carried out by an entity that is executing on the computing device 101, e.g., the OS 152. However, it is noted that other entities can be configured to carry out the method 300 without departing from the scope of this disclosure, e.g., a bootstrap OS executing on the computing device 101, an external entity configured to communicate with the computing device 101, and the like.

As shown in FIG. 3, the method 300 begins at step 302, where the OS 152 receives a request to establish a container 108 within the storage device 102. At step 304, the OS 152 references the partition table 104 of the storage device 102 to identify whether a compatible partition 106 exists for the container 108. According to some embodiments, identifying whether the compatible partition 106 exists can involve carrying out different checks in accordance with parameters of the request. For example, the request can indicate that the container 108 will require at least four gigabytes (4 GB) to accommodate one or more FS volumes 128 that eventually will be established within the container 108. In this example, the OS 152 can be configured to parse the partition table 104 to identify one or more partitions 106 that currently are established within the storage device 102. For example, the OS 152 can analyze the existing partitions 106 to identify whether (1) an existing partition 106 can accommodate the container 108, or (2) a new partition 106 needs to be established to accommodate the container 108. Alternatively, the request can specify a particular partition 106 to which the container 108 should be assigned, e.g., when the entity issuing the request has already identified the particular partition 106. Alternatively, the request can definitively require the establishment of a new partition 106 within the storage device 102 to accommodate the container 108.

At step 306, the OS 152 determines whether a compatible partition 106 exists. If, at step 306, the OS 152 determines that a compatible partition 106 does not exist, then the method proceeds to step 308. Otherwise, the method proceeds to step 310, described below in greater detail. At step 308, the OS 152 establishes a compatible partition 106 for the container 108 within the storage device 102. This can involve, for example, updating the partition table 104 to indicate the establishment of the compatible partition 106. At step 310, the OS 152 assigns the container 108 to the compatible partition 106. This can involve, for example, establishing the various elements of the container 108 illustrated in FIG. 1, e.g., a manager 122, an FS volume table 126, and, optionally, one or more FS volumes 128, which is described in greater detail below in conjunction with FIG. 4. Finally, at step 312, the OS 152 updates the partition table 104 to reflect the assignment of the container 108 to the compatible partition 106.

FIG. 4 illustrates a method 400 for establishing a new FS volume 128 within a container 108, according to some embodiments. In the following description, the method 400 is carried out by an entity that is executing on the computing device 101, e.g., a manager 122 belonging to the container 108. However, it is noted that other entities can be configured to carry out the method 400 without departing from the scope of this disclosure. For example, an API can be configured to implement the method 400.

As shown in FIG. 4, the method 400 begins at step 402, where the manager 122 receives a request to establish a new FS volume 128 volume within an existing container 108. The request can be issued, for example, by the OS 152 executing on the computing device 101, or by another entity executing on the computing device 101 or in communication with the computing device 101. At step 404, the manager 122 references the FS volume table 126 of the container 108 to identify whether the new FS volume 128 can be established within the container 108. According to some embodiments, the manager 122 can be configured to reference requirement parameters included in the request against the FS volume table 126 to identify if any deficiencies exist with respect to generating the new FS volume 128.

Consider, for example, a request that indicates that the new FS volume 128 will require a particular storage size range (e.g., 4 GB to 6 GB) to be available at all times. In response, the manager 122 can reference the FS volume table 126/metadata 130/content 132 of existing FS volumes 128 within the container to effectively determine an amount of free storage space that is available within the partition 106 to which the container 108 is assigned. In turn, the manager 122 can determine whether the amount of free storage space is sufficient to satisfy the particular storage size range indicated in the request. Continuing with the foregoing example, the manager 122 would determine whether at least 6 GB of storage space is available to ensure that the required particular storage size range of 4 GB to 6 GB can be properly enforced.

At step 406, the manager 122 determines whether the FS volume 128 can be established. If, at step 406, the manager 122 determines that the FS volume 128 can be established, then the method 400 proceeds to step 408. Otherwise, the method 400 ends, e.g., an error message can be returned to the entity that issued the request. At step 408, the manager 122 establishes the FS volume 128 within the container 108. According to some embodiments, this can involve establishing metadata 130 and content 132 for the FS volume 128. Finally, at step 410, the manager 122 updates the FS volume table 126 to reflect the establishment of the FS volume 128 within the container 108.

FIG. 5 illustrates a method 500 for handling storage space allocation requests issued in association with an FS volume 128 of a container 108, according to some embodiments. It is noted that although the method 500 focuses on storage space allocation requests, the techniques described herein can similarly handle other I/O requests including for example, delete requests, where write I/O requests and read I/O requests can be handled directly within the FS volumes 128. In the following description, the method 500 is carried out by an entity that is executing on the computing device 101, e.g., a manager 122 of the container 108. However, it is noted that other entities can be configured to carry out the method 400 without departing from the scope of this disclosure.

As shown in FIG. 5, the method 500 begins at step 502, where the manager 122 receives a storage space allocation request in association with an FS volume 128. This request can be issued, for example, in response to a user application attempting to create a new directory/file within the FS volume 128. At step 504, the manager 122 parses space management information to determine whether storage space can be allocated in accordance with the request. According to some embodiments, this can involve referencing one or more data structures managed by the manager 122, where the data structures define the manner in which storage space is allocated across other FS volumes 128 (if any) included in the container 108. For example, the data structures can maintain information associated with the metadata 130/content 132 of the other FS volumes 128 to properly determine where space should be allocated within the partition 106 to which the container 108 is assigned. Alternatively, or supplementary, the manager 122 can be configured to directly access the metadata 130/content 132 of the other FS volumes 128 to properly determine where space should be allocated within the partition 106 to which the container 108 is assigned.

Accordingly, at step 506, the manager 122 determines whether the storage space can be allocated in accordance with the request. If, at step 506, the manager 122 determines that storage space can be allocated in accordance with the request, then the method 500 proceeds to step 508. Otherwise, the method 500 ends, e.g., an error message can be returned to the entity that issued the request.

At step 508, the manager 122 allocates the storage space in accordance with the request. This can involve, for example, identifying one or more free storage blocks (based on a size of the storage space allocation request) within the partition 106 to which the container 108 is assigned. At step 510, the manager 122 updates the space management information to reflect the storage space allocation. Referring back to the foregoing examples, step 510 can involve updating the data structures (managed by the manager 122) that maintain information associated with the metadata 130/content 132. Alternatively, the manager 122 can be configured to directly access and update the metadata 130/content 132 of the FS volume 128 to reflect the storage space allocation. Finally, at step 512, the manager 122 issues a response to the request, where the response includes storage space allocation parameters, i.e., information pertaining to the results of the storage space allocation request. The storage space allocation parameters can include, for example, physical addresses of the free storage blocks reserved by the manager 122 in accordance with the request. In turn, the requesting entity, e.g., the user application, can be configured to utilize the storage space allocation parameters to carry out the creation of a new directory/file within the FS volume 128.

FIGS. 6A-6G illustrate a conceptual diagram 600 of a technique for efficiently establishing an FS volume 128 within the storage device 102 from an image of an established (i.e., data-populated) FS volume 128, according to some embodiments. According to some embodiments, this technique can be utilized to avoid the necessity of extracting and writing the content 132 of the FS volume 128 to the storage device 102 after the image of the FS volume 128 is initially written to the storage device 102 (e.g., as a single file), which otherwise would be required and consume a considerable amount of resources/time. In one example, this technique can be implemented to increase the efficiency by which intensive updates to file systems are installed onto the computing device 101. For example, this technique can be used to replace an existing FS volume 128 for the OS 152 with an image of a new FS volume 128 for an updated OS, which described below in greater detail in conjunction with the example scenario illustrated in FIGS. 6A-6G.

Figure 6A:
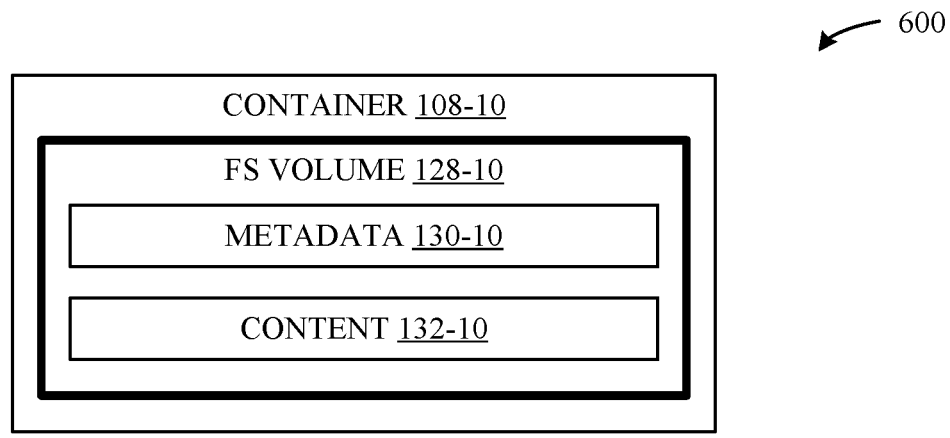
FIGS. 6A-6G illustrate a conceptual diagram of a technique for efficiently establishing an FS volume within the storage device (of the computing device of FIG. 1) from an image of an established (i.e., data-populated) FS volume, according to some embodiments.
Figure 6B:
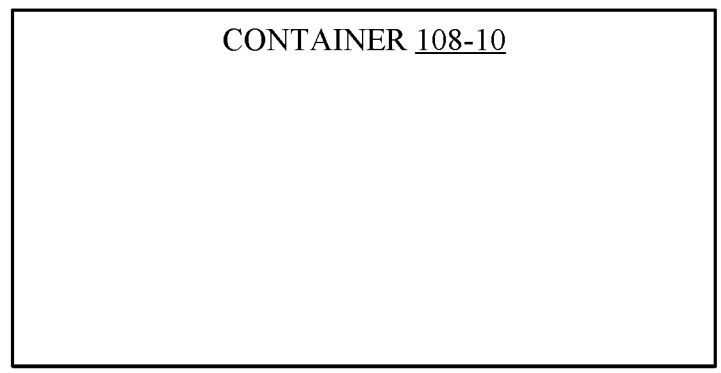
Figure 6C:
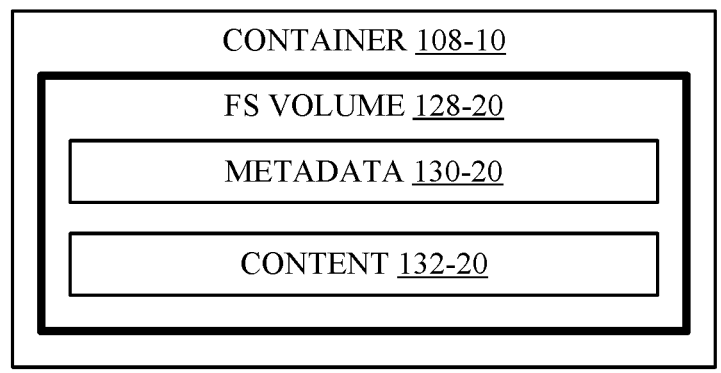

As shown in FIG. 6A, an existing container 108-10 (at the computing device 101) can be configured to include an FS volume 128-10, where the FS volume 128-10 includes metadata 130-10 and content 132-10. According to the example scenario illustrated in FIG. 6A, the FS volume 128-10 can represent an existing operating system installed on the computing device 101, e.g., the OS 152 illustrated in FIG. 1, where an updated OS is available. Next, as shown in FIG. 6B, the FS volume 128-10 is deleted from the container 108-10. It again is noted that the illustrations of FIGS. 6A-6G are exemplary and that other approaches/scenarios can apply. For example, overall crash protection can be enhanced by maintaining the FS volume 128-10 while the new FS volume (that includes the updated OS), assuming the necessary amount of storage space is available. Next, at FIG. 6C, a new FS volume 128-20 is established in the container 108-10, e.g., in accordance with the techniques described above in conjunction with FIG. 4, where the new FS volume 128-20 includes metadata 130-20 and content 132-20.

Figure 6D:
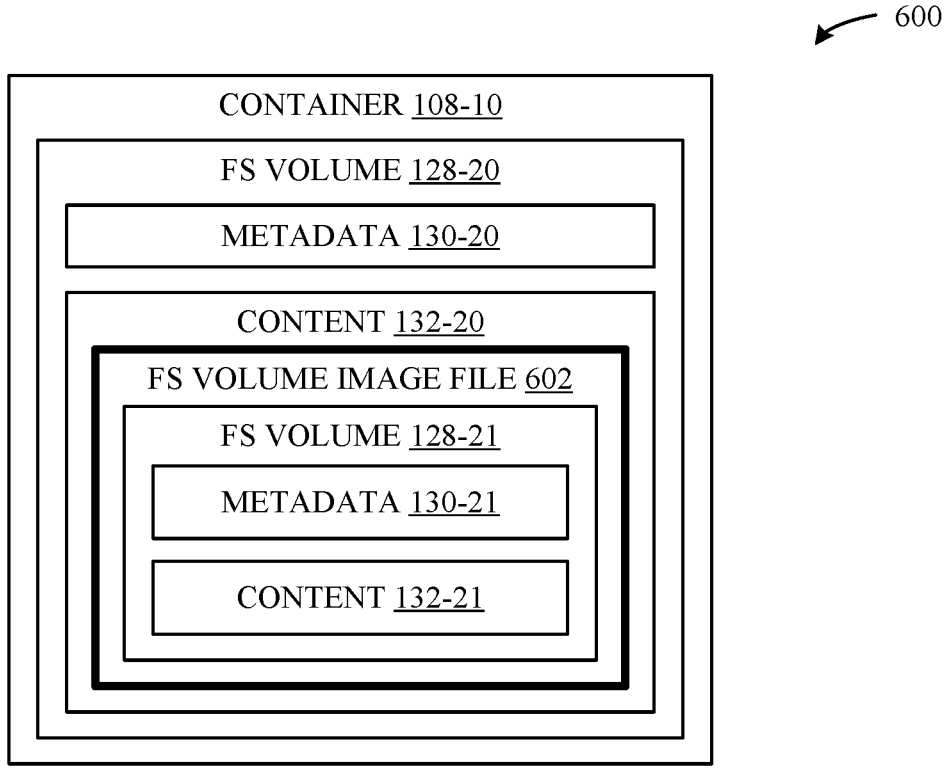

Next, as shown in FIG. 6D, an image of the new OS—illustrated in FIG. 6D as the FS volume image file 602—is established within the content 132-20 of the new FS volume 128-20, e.g., in accordance with the storage space allocation techniques described above in conjunction with FIG. 5. According to some embodiments, the FS volume image file 602 can represent a container 108 that includes an FS volume 128. For example, as shown in FIG. 6D, the FS volume image file 602 includes a complete copy of an FS volume 128-21, where the FS volume 128-21 includes metadata 130-21 and content 132-21. According to this example, the FS volume 128-21 can represent a complete file system for the updated OS. For example, the metadata 130-21 can store information about the FS volume 128-21, e.g., a type of the FS volume 128-21, encryption schemes (if any) that are implemented within the FS volume 128-21, information about the content 132-21, and the like, whereas the content 132-21 can store information about the updated OS data included in the FS volume 128-21, e.g., files, directories, and the like.

Figure 6E:
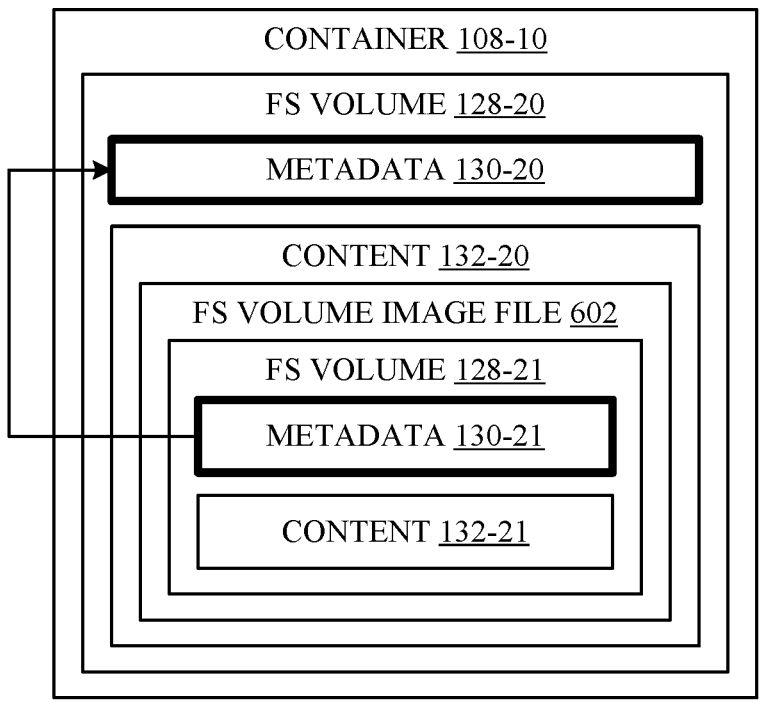
Figure 6F:
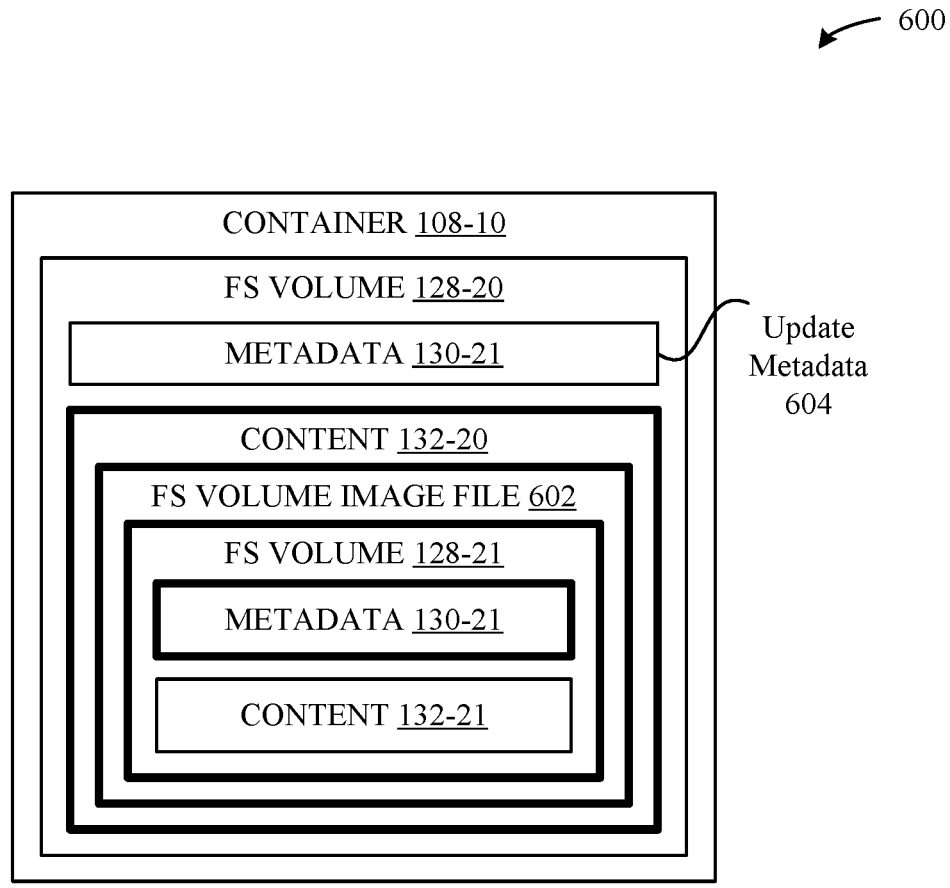
Figure 6G:
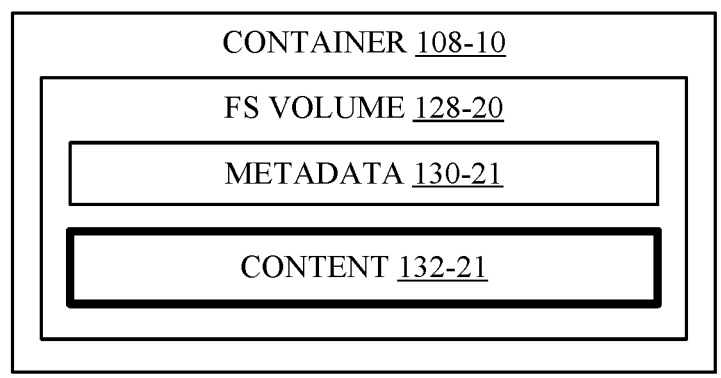

Next, as shown in FIG. 6E, the metadata 130-20 included in the new FS volume 128-20 is replaced by the metadata 130-21 included in the FS volume image file 602. Consequently, the new FS volume 128-20 points to the content 132-21 (included in the FS volume image file 602). However, in some cases, the information included in the metadata 130-21 can be offset by a particular degree due to the various nesting layers established throughout this technique. Accordingly, and as shown in FIG. 6F, a touchup operation 604 can be performed to update the metadata 130-21 so that it properly references the content 132-21 included in the FS volume image file 602. In this manner, the boundaries associated with the content 132-20, the FS volume image file 602, the FS volume 128-21, and the metadata 130-21 can be deconstructed, such that the new FS volume 128-20 remains with the proper metadata 130-21/content 132-21, as shown in FIG. 6G. Moreover, the touchup operation 604 can involve marking the metadata 130-21 for deletion within the FS volume image file 602/FS volume 128-21 as that portion of data is now stored within the FS volume 128-20 (and therefore the copy is no longer needed).

Accordingly, the foregoing technique described in conjunction with FIGS. 6A-6G can be utilized to eliminate the need to extract/write the content 132-21 of the FS volume image file 602 to the storage device 102 after the FS volume image file 602 is initially written to the storage device 102, which otherwise would be required and consume a considerable amount of resources/time.

Figure 7:
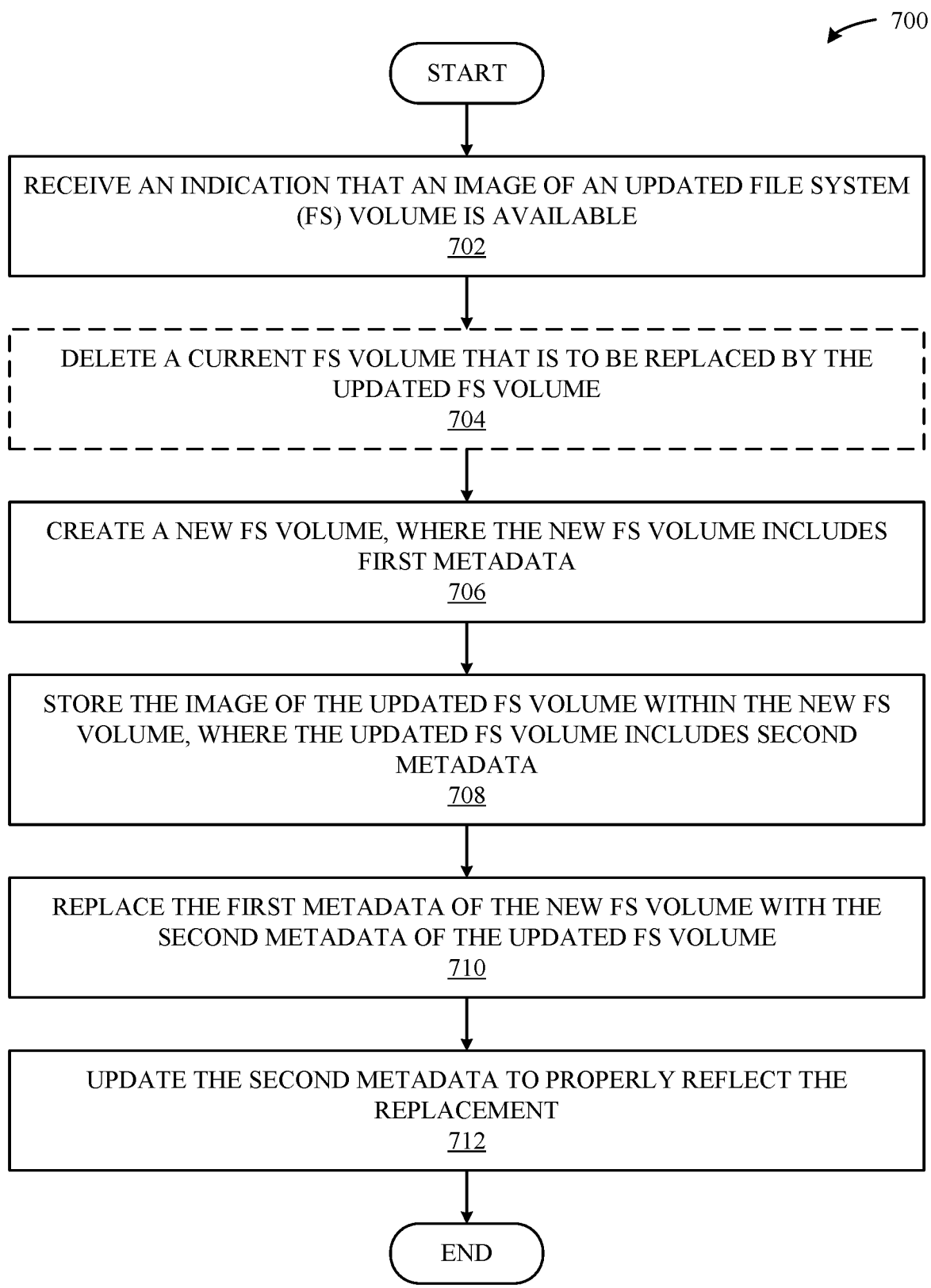
FIG. 7 illustrates a method for efficiently establishing an FS volume within the storage device from an image of an established (i.e., data-populated) FS volume, according to some embodiments.

FIG. 7 illustrates a method 700 for efficiently establishing an FS volume 128 within the storage device 102 from an image of an established (i.e., data-populated) FS volume 128, according to some embodiments. In the following description, the method 700 is carried out by an entity that is executing on the computing device 101, e.g., the OS 152. However, it is noted that other entities can be configured to carry out the method 700 without departing from the scope of this disclosure, e.g., a bootstrap OS executing on the computing device 101, an external entity configured to communicate with the computing device 101, and the like.

As shown in FIG. 7, the method 700 begins at step 702, where the OS 152 receives an indication that an image of an updated FS volume 128 (e.g., the FS volume image file 602 of FIG. 6) is available. At optional step 704, the OS 152 deletes a current FS volume 128 that is to be replaced by the updated FS volume 128 (see, for example, FIGS. 6A-6B). Again, this step is optional, and the current FS volume 128 can remain intact (e.g., for crash protection) if so desired. At step 706, the OS 152 creates a new FS volume 128, where the new FS volume 128 includes first metadata 130 (see, for example, FIG. 6C).

Next, at step 708, the OS 152 stores the image of the updated FS volume 128 within the new FS volume 128, where the updated FS volume 128 includes second metadata 130 (see, for example, FIG. 6D). At step 710, the OS 152 replaces the first metadata 130 of the new FS volume 128 with the second metadata 130 of the updated FS volume 128 (see, for example, FIG. 6E). Finally, at step 712, the OS 152 updates the second metadata to properly reflect the replacement (see, for example, FIGS. 6F-6G).

Figure 8:
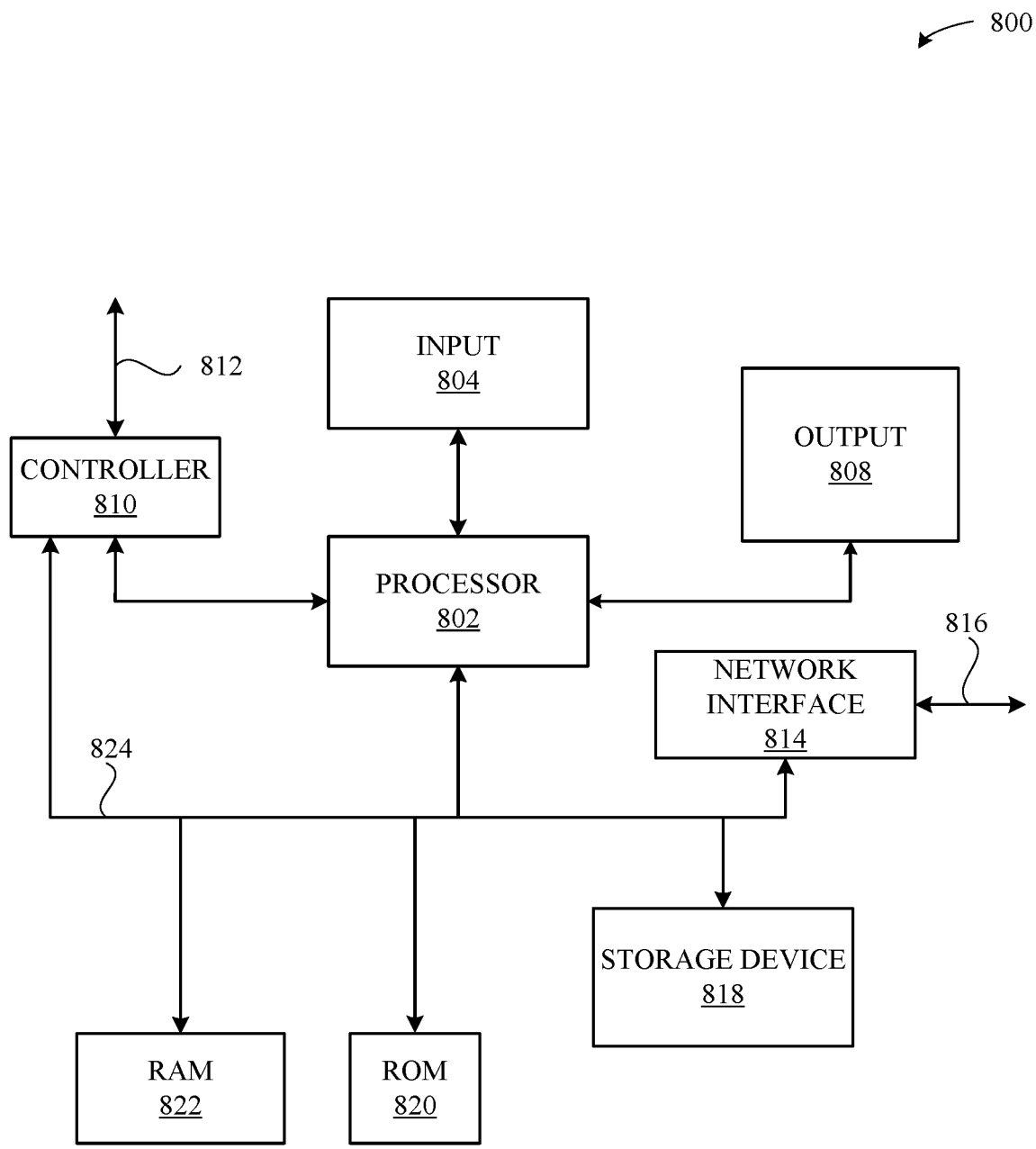
FIG. 8 is a block diagram of a computing device that can represent the components of a computing device or any other suitable device or component for realizing any of the methods, systems, apparatus, and embodiments described herein.

FIG. 8 is a block diagram of a computing device 800 that can represent the components of the computing device 101 (of FIG. 1) or any other suitable device or component for realizing any of the methods, systems, apparatus, and embodiments described herein. It will be appreciated that the components, devices or elements illustrated in and described with respect to FIG. 8 may not be mandatory and thus some may be omitted in certain embodiments. As shown in FIG. 8, the computing device 800 can include a processor 802 that represents a microprocessor, a coprocessor, circuitry and/or a controller for controlling the overall operation of computing device 800. Although illustrated as a single processor, it can be appreciated that the processor 802 can include a plurality of processors. The plurality of processors can be in operative communication with each other and can be collectively configured to perform one or more functionalities of the computing device 800 as described herein. In some embodiments, the processor 802 can be configured to execute instructions that can be stored at the computing device 800 and/or that can be otherwise accessible to the processor 802. As such, whether configured by hardware or by a combination of hardware and software, the processor 802 can be capable of performing operations and actions in accordance with embodiments described herein.

The computing device 800 can also include user input device 804 that allows a user of the computing device 800 to interact with the computing device 800. For example, user input device 804 can take a variety of forms, such as a button, keypad, dial, touch screen, audio input interface, visual/image capture input interface, input in the form of sensor data, etc. Still further, the computing device 800 can include an output 808 that can be controlled by processor 802. The output 808 can include a display device, audio device, haptic feedback device, or any other output device suitable for providing output to a user of a device. Controller 810 can be used to interface with and control different equipment through equipment control bus 812. The computing device 800 can also include a network/bus interface 814 that couples to data link 816. Data link 816 can allow the computing device 800 to couple to a host computer or to accessory devices. The data link 816 can be provided over a wired connection or a wireless connection. In the case of a wireless connection, network/bus interface 814 can include a wireless transceiver.

The computing device 800 can also include a storage device 818, which can have a single disk or a plurality of disks (e.g., hard drives) and a storage management module that manages one or more partitions within the storage device 818. In some embodiments, the storage device 818 can include flash memory, semiconductor (solid state) memory or the like. Still further, the computing device 800 can include Read-Only Memory (ROM) 820 and Random Access Memory (RAM) 822. The ROM 820 can store programs, code, instructions, utilities or processes to be executed in a non-volatile manner. The RAM 822 can provide volatile data storage, and store instructions related to components of the storage management module that are configured to carry out the various techniques described herein. The computing device 800 can further include data bus 824. Data bus 824 can facilitate data and signal transfer between at least processor 802, controller 810, network/bus interface 814, storage device 818, ROM 820, and RAM 822.

Embodiments

The embodiments set forth a method for establishing a file system (FS) volume within a container. According to some embodiments, the method includes the steps of: (1) receiving a request to establish the FS volume within the container, wherein the container is configured to include at least one other FS volume, (2) referencing an FS volume table of the container to identify whether the FS volume can be established within the container, and (3) when the FS volume can be established: establishing the FS volume within the container, and updating the FS volume table to reflect that the FS volume is established within the container.

In some embodiments, the container is associated with a partition of a storage device. In some embodiments, the partition is associated with a subset of available storage space within the storage device, or the partition is associated with all available storage space within the storage device. In some embodiments, the container is configured to manage a plurality of FS volumes, and the plurality of FS volumes share available storage space within the partition. In some embodiments, each FS volume of the plurality of FS volumes can freely expand and contract in size without requiring the partition to be resized when a collective amount storage space consumed by the plurality of FS volumes does not exceed the available storage space within the partition. According to some embodiments, identifying whether the FS volume can be established comprises: determining that a minimum size requirement associated with the FS volume exceeds the available storage space within the partition. In some embodiments, a first FS volume of the plurality of FS volumes implements an encryption scheme, and a second FS volume of the plurality of FS volumes does not implement any encryption scheme. In some embodiments, the container implements a unified checkpoint log that can be used to provide crash protection within the container.

It is noted that the foregoing method steps can be implemented in any order, and that different dependencies can exist among the various limitations associated with the method steps.

The embodiments additionally set forth a method for handling input/output (I/O) requests across different file system (FS) volumes. According to some embodiments, the method includes the steps of: (1) receiving an I/O request for a first FS volume, (2) parsing information associated with the first FS volume and at least one other FS volume to determine whether the I/O request can be satisfied, and (3) when the I/O request can be satisfied: executing the I/O request, updating the information to reflect that the I/O request is executed, and issuing a response to the I/O request.

In some embodiments, the first FS volume and the second FS volume are included in a container that is associated with a partition of a storage device. In some embodiments, the container implements a unified checkpoint log that can be used to provide crash protection within the container. In some embodiments, the I/O request comprises a storage space allocation request, and determining whether the I/O request can be satisfied comprises: determining whether a first size of available storage space within the partition exceeds a second size of storage space associated with the storage space allocation request. In some embodiments, the I/O request comprises a storage space deletion request, and determining whether the I/O request can be satisfied comprises: determining whether one or more blocks within the partition can be deleted in accordance with the storage space deletion request. In some embodiments, the storage space deletion request is executed, the one or more blocks deleted within the partition in accordance with the storage space deletion request can be allocated by either the first FS volume or the second FS volume.

It is noted that the foregoing method steps can be implemented in any order, and that different dependencies can exist among the various limitations associated with the method steps.

The embodiments additionally set forth a method for efficiently establishing, within a storage device, a file system (FS) volume from an image of the FS volume. According to some embodiments, the method includes the steps of: (1) receiving an indication that the image of the FS volume is available, (2) creating a new FS volume within a container, wherein the new FS volume includes first metadata, (3) storing the image of the FS volume within the new FS volume, wherein the FS volume includes second metadata, and (4) replacing the first metadata of the new FS volume with the second metadata of the FS volume.

According to some embodiments, the steps further include: deleting a current FS volume that is to be replaced by the FS volume. In some embodiments, the current FS volume is associated with a current version of an operating system (OS), and the FS volume is associated with an updated version of the OS. According to some embodiments, the steps further include, subsequent to replacing the first metadata of the new FS volume with the second metadata of the FS volume: updating the second metadata to properly reference content included in the image of the FS volume. In some embodiments, the container is configured to manage a plurality of FS volumes. In some embodiments, the new FS volume is included in the plurality of FS volumes prior to replacing the first metadata with the second metadata, and the new FS volume is excluded from the plurality of FS volumes subsequent to replacing the first metadata with the second metadata.

It is noted that the foregoing method steps can be implemented in any order, and that different dependencies can exist among the various limitations associated with the method steps.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device configured to efficiently establish, within a storage device, a file system (FS) volume from an image of the FS volume, the computing device comprising:
at least one processor; and
at least one memory configured to store instructions that, when executed by the at least one processor, cause the computing device to:
receive an indication that the image of the FS volume is available;
create a new FS volume within a container, wherein:
the new FS volume includes first metadata that corresponds to the new FS volume, and
the new FS volume is distinct to the FS volume;
store the image of the FS volume within the new FS volume, wherein the FS volume includes second metadata that corresponds to the FS volume;
overwrite the first metadata of the new FS volume with the second metadata of the FS volume; and
update the second metadata to properly reference content included in the image of the FS volume.

2. The computing device of claim 1, wherein the at least one processor further causes the computing device to:
delete a current FS volume that is to be replaced by the FS volume.

3. The computing device of claim 2, wherein the current FS volume is associated with a current version of an operating system (OS), and the FS volume is associated with an updated version of the OS.

4. The computing device of claim 3, wherein the indication is received in response to the updated version of the OS becoming available.

5. The computing device of claim 1, wherein the container is configured to manage a plurality of FS volumes.

6. The computing device of claim 5, wherein the new FS volume is included in the plurality of FS volumes prior to replacing the first metadata with the second metadata, and the new FS volume is excluded from the plurality of FS volumes subsequent to replacing the first metadata with the second metadata.

7. The computing device of claim 1, wherein the container is associated with a partition of the storage device.

8. A method for efficiently establishing, within a storage device, a file system (FS) volume from an image of the FS volume, the method comprising:
receive an indication that the image of the FS volume is available;
create a new FS volume within a container, wherein:
the new FS volume includes first metadata that corresponds to the new FS volume, and
the new FS volume is distinct to the FS volume;
store the image of the FS volume within the new FS volume, wherein the FS volume includes second metadata that corresponds to the FS volume;
overwrite the first metadata of the new FS volume with the second metadata of the FS volume; and
update the second metadata to properly reference content included in the image of the FS volume.

9. The method of claim 8, further comprising:
deleting a current FS volume that is to be replaced by the FS volume.

10. The method of claim 9, wherein the current FS volume is associated with a current version of an operating system (OS), and the FS volume is associated with an updated version of the OS.

11. The method of claim 10, wherein the indication is received in response to the updated version of the OS becoming available.

12. The method of claim 8, wherein the container is configured to manage a plurality of FS volumes.

13. The method of claim 12, wherein the new FS volume is included in the plurality of FS volumes prior to replacing the first metadata with the second metadata, and the new FS volume is excluded from the plurality of FS volumes subsequent to replacing the first metadata with the second metadata.

14. The method of claim 8, wherein the container is associated with a partition of the storage device.

15. At least one non-transitory computer readable storage medium configured to store instructions that, when executed by at least one processor included in a computing device, cause the computing device to efficiently establish, within a storage device, a file system (FS) volume from an image of the FS volume, by carrying out steps that include:
receiving an indication that the image of the FS volume is available;
creating a new FS volume within a container, wherein the new FS volume includes first metadata;
storing the image of the FS volume within the new FS volume, wherein the FS volume includes second metadata; and
overwriting the first metadata of the new FS volume with the second metadata of the FS volume.

16. The at least one non-transitory computer readable storage medium of claim 15, wherein the steps further include:
deleting a current FS volume that is to be replaced by the FS volume.

17. The at least one non-transitory computer readable storage medium of claim 16, wherein the current FS volume is associated with a current version of an operating system (OS), and the FS volume is associated with an updated version of the OS.

18. The at least one non-transitory computer readable storage medium of claim 17, wherein the indication is received in response to the updated version of the OS becoming available.

19. The at least one non-transitory computer readable storage medium of claim 15, wherein the container is configured to manage a plurality of FS volumes.

20. The at least one non-transitory computer readable storage medium of claim 19, wherein the new FS volume is included in the plurality of FS volumes prior to replacing the first metadata with the second metadata, and the new FS volume is excluded from the plurality of FS volumes subsequent to replacing the first metadata with the second metadata.

* * * * *